(12) United States Patent
Stoessel (10) Patent No.: US 6,569,322 B1
(45) Date of Patent: May 27, 2003

(54) METAL STEARATE DENITRIFICATION SYSTEM

(75) Inventor: Ronald K. Stoessel, Mandeville, LA (US)

(73) Assignee: University of New Orleans Research and Technology Foundation, Inc., New Orleans, LA (US)

( * ) Notice: Subject to any disclaimer, the term of this patent is extended or adjusted under 35 U.S.C. 154(b) by 0 days.

(21) Appl. No.: 09/861,462

(22) Filed: May 18, 2001

Related U.S. Application Data (60) Provisional application No. 60/205,158, filed on May 18, 2000.

(51) Int. Cl.⁷ .................................................. C02F 3/00
(52) U.S. Cl. ..................... 210/151; 210/266; 210/532.2; 210/903; 210/617
(58) Field of Search ................................. 210/150, 151, 210/170, 299, 266, 532.2, 617, 903

(56) References Cited

U.S. PATENT DOCUMENTS

| | | | | |
|---|---|---|---|---|
| 3,829,377 A | * | 8/1974 | Hashimonto | 210/150 |
| 4,465,594 A | * | 8/1984 | Laak | 210/170 |
| 4,469,599 A | * | 9/1984 | Gros et al. | 210/903 |
| 4,800,021 A | * | 1/1989 | Desbos | 210/150 |
| 4,925,552 A | * | 5/1990 | Bateson et al. | 210/150 |
| 5,330,651 A | * | 7/1994 | Robertson et al. | 210/617 |
| 5,494,581 A | * | 2/1996 | Hobson | 210/150 |
| 5,755,966 A | * | 5/1998 | Mackrle et al. | 210/903 |
| 5,800,709 A | * | 9/1998 | Smith | 210/151 |
| 5,908,555 A | * | 6/1999 | Reinsel et al. | 210/903 |
| 6,077,429 A | * | 6/2000 | Frankenberger, Jr. et al. | 210/605 |
| 6,100,081 A | * | 8/2000 | Buelnn | 210/150 |
| 6,383,372 B1 | * | 5/2002 | Houck et al. | 210/150 |

OTHER PUBLICATIONS

Stuessell et al "Denitripilntsm and Phosphate Removal using Al Stenrate", 2001.*

* cited by examiner

*Primary Examiner*—Christopher Upton
(74) *Attorney, Agent, or Firm*—Garvey, Smith, Nehrbass & Doody, L.L.C.; Seth M. Nehrbass (57) ABSTRACT

A metal stearate denitrification system utilizes insoluble and hydrophobic metal stearates as a carbon source for the bacterial substrate. The system in a long-term, low-maintenance denitrification cell is a flow-through plastic container having a replaceable porous liner filled with a porous and permeable mixture of metal stearate and volcanic scoria and a small amount of soil as a bacteria source. Oxidized effluent from an aerated home septic tank enters the container near its base and exits near its top. The insoluble and hydrophobic metal stearate remains in place as the fluid flows through the container. Over a time span of years, the metal stearate is gradually destroyed by bacteria using stearate as a metabolic food source. The aerobic bacteria first remove the dissolved oxygen in the entering fluid and then the anaerobic bacteria denitrify the nitrate. Laboratory tests using aluminum stearate indicate that within an hour's residence time, a minimum of 15 and 26 mg/l $NO_3$-N are expected to be removed from input solutions containing 18 and 36 mg/l N, respectively. When the stearate is totally removed, the liner can be removed from the container and the reactant mixture replaced with a fresh mixture for reinsertion into the container.

20 Claims, 7 Drawing Sheets

Schematic of the metal stearate denitrification cell 10 using aluminum stearate

Figure 1. Schematic of column setup.

Figure 2. Denitrification of 2.26 mg/l $NO_3$-N solutions. The experiments utiliized cellulose (pine shavings), △, and Al stearate, ○, as a carbon source.

Figure 3. Denitrification of 36.14 mg/l $NO_3$-N solutions, utilizing Al stearate, △, and Ca distearate, □, as carbon sources. $NO_2$ was below detection.

Figure 4. Denitrification of $NO_3$ solutions of 2.26 mg/l $NO_3$-N, □, and 5.52 $NO_3$-N mg/l, △. $NO_2$ was below detection.

Figure 5. Denitrification of $NO_3$ solutions of 18.07 mg/l $NO_3$-N, □, and 36.14 $NO_3$-N mg/l, △. $NO_2$ was below detection.

Figure 6. Phosphate removal after $PO_4$ sorption was complete utilizing bauxite, O; Al stearate, △; and Ca distearate, □. The dashed lines show the 4 input concentrations.

Figure 7. Schematic of the metal stearate denitrification cell 10 using aluminum stearate

METAL STEARATE DENITRIFICATION SYSTEM

CROSS-REFERENCE TO RELATED APPLICATIONS

Priority of my U.S. Provisional Patent Application Ser. No. 60/205,158, filed May 18, 2000, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to denitrification. More particularly, the present invention relates to using low-solubility metal stearates for performing denitrification.

The metal stearate denitrification system is a nutrient removal system in which nitrate is removed from water using a biological treatment method that incorporates a metal stearate such as aluminum stearate for denitrifying bacteria metabolism. In addition, some phosphate removal occurs through the precipitation of metal phosphates such as aluminum phosphate.

2. General Background of the Invention

Brief description of presently used technology and its disadvantages.

Denitrification can be used to remove excess nitrate from waste waters. These include waste waters released as oxidized effluent from home septic tanks, from municipal and agriculture oxidation lagoons, from landfills, from marine waste systems, from industrial systems, and waste waters generated within enclosed circulating systems such as aquariums. For the purpose of discussion of presently used technology, denitrification of waste waters from home septic tanks and oxidation lagoons will be used as examples.

Denitrification utilizes bacteria to reduce nitrate to nitrogen gas which is lost to the atmosphere. Denitrification rates increase with temperature and require the absence of measurable oxygen or anoxic conditions (Manahan, 1994). Different organic substrates have been tested for bacterial metabolism and the denitrification rate varies with the substrate. The most rapid rates occur using water-soluble organic compounds like acetate; however, low solubility substrates are needed for low maintenance systems. Present technology commonly utilizes wood cellulose as the bacteria substrate (Robertson and Cherry, 1994; Robertson and Anderson, 1999; Robertson et al., 2000). The problem is that cellulose-based denitrification is often incomplete and requires time on the order of a day, rather than an hour, for most of the denitrification to occur (Stoessell et al., 2001). Described herein is the use of low solubility metal stearates, in particular, aluminum stearate which bacteria can use much more rapidly than cellulose for denitrification.

At present, home septic systems, lacking a drain field, discharge their effluent into ditches in rural areas and into street curbs in urban areas. In some cases, an aeration system is used within the tank, to convert nitrogen as amunonium to nitrate prior to discharge. However, present technology does not remove nitrogen as either ammonium or nitrate from the effluent. Similar problems exist with oxidation lagoons which generally use air bubbling systems to oxidize organic matter and attempt to convert ammonium to nitrate. If the effluent is passed through a wetlands, prior to being discharged, some or all of the nitrate will be denitrified provided the residence time is of the order of days. Otherwise, the ammonium or nitrate-rich effluent is input into canals and streams.

3. Description of Related Art

The denitrification system described here was developed to remove nitrate from the effluent of aerobic septic tanks. The typical septic tank discharges ammonium-containing effluent which is oxidized to nitrate in an aerobic drain field in the soil (Wilhelm et al. 1994). The nitrate is then subsequently removed downstream by denitrification within an anaerobic drain field having a carbon-rich substrate (Lampert and Sommer, 1997). A problem arises in areas having a high water table (near the surface) or a limited lot size (in a town). Drainage fields are not practical under these circumstances and the effluent is usually discharged by pipe directly to a drainage ditch or street curb. Use of an air-bubbling system within the septic tank can substitute for the aerobic drain field, but the discharge still contains nitrogen in the form of nitrate. To minimize the possibility of eutrophication in surface waters, the nitrate needs to be removed prior to the effluent being discharged into a drainage ditch (Connell and Miller, 1984).

REFERENCES CITED
(All Incorporated Herein by Reference)

Connell, D. W. and G. J. Miller. 1984. Chemistry and ecotoxicology of pollution. New York, N.Y.: John Wiley and Sons.

Lambert W. and U. Sommer. 1997. Limnoecology: The ecology of lakes and Streams. Oxford, United Kingdom: Oxford University Press, Inc.

Manahan, S. E. 1994. Environmental chemistry. Boca Raton, Fla.: CRC Press, Inc.

Robertson, W. D. and M. R. Anderson. 1999. Nitrogen removal from landfill leachate using an infiltration bed coupled with a denitrification barrier. Ground Water Monitoring and Remediation 19, no. 4: 73–80.

Robertson, W. D. and J. A. Cherry. 1994. In situ denitrification of septic-system nitrate using reactive porous media barriers: Field trials. Ground Water 33, no. 1: 99–11.

Robertson W. D., D. W. Blowes, C. J. Ptacek and J. A. Cherry. 2000. Long-term performance of in situ barriers for nitrate remediation. Ground Water 38, no 5:689–695.

Stoessell, R. K., D. H. Easley and G. P. Yamazaki. (2001) Denitrification and phosphate removal using Al stearate. Ground Water Monitoring and Remediation. 21, no. 2: 89–95.

Wilhelm, S. R., S. L. Schiff and J. A. Cherry. 1994. Biogeochemical evolution of domestic waste water in septic systems: 1. Conceptional model. Ground Water 32, no. 6: 905–916.

The following U.S. Patents are incorporated herein by reference: U.S. Pat. Nos. 6,100,081; 6,077,429; 5,908,555; 5,800,709; 5,755,966; 5,494,581 and are discussed below. These are examples of patents for biotreatment processes for denitrification of waste waters and strains of denitrifying bacteria. However, none of these patents mention, discuss, or specify the use of metal stearates for denitrification as described herein.

The anoxic biotreatment cell of U.S. Pat. No. 5,908,555 is a denitrification cell designed for removing nitrates from mining, milling, and industrial-fluid wastes, incorporating an additional phosphate source and methanol as the carbon source for the bacterial substrate. This is a high-maintenance flow-through cell, requiring continuous addition of water-soluble methanol and phosphate. The biofilter of U.S. Pat. No. 6,100,081 utilizes layers of peat and wood shavings as a carbon source for the bacterial substrate for denitrification and for other processes involving water purification. The biological aerated filter of U.S. Pat. No. 5,800,709 contains both aerobic (upstream) and anaerobic (downstream) sections to accomplish both aerobic decay and anaerobic denitrification within the same vessel, but the patent does not specify a particular carbon source for the bacterial substrate for denitrification. In general, filter systems are not low maintenance, requiring backwashing to remove clogging from bacteria flocculates (biosols) and other particulate matter. Modification of activated sludge systems and bioreactors have also been proposed to facilitate denitrification in systems designed primarily for aerobic decay, e.g., U.S. Pat. Nos. 5,755,966 and 5,494,581. Finally, even the use of strains of bacteria have been patented for denitrification, e.g., a patent (U.S. Pat. No. 6,077,429) has been issued for the anaerobic perlace bacteria to denitrify nitrate and also to breakdown perchlorate.

Common soap contains metal stearate, but the metal stearate used in common soap is soluble in water and would not last long if one tried to use it as a carbon source for denitrifying bacteria.

BRIEF SUMMARY OF THE INVENTION

The unique aspect of the denitrification system of the present invention is the use of insoluble and hydrophobic metal stearate as a bacterial substrate for food for the denitrification process. For an application example, the denitrification system of the present invention can be used in an in-line system for denitrification of aerobic septic-tank effluent prior to being discharged into a drainage ditch or to a street curb.

Flow-through column experiments show aluminum stearate to be an extremely efficient substrate in denitrification, removing up to 26 mg/l of $NO_3$-N in an hour from input solutions containing 36 mg/l $NO_3$-N. Ca stearate was less efficient, removing 13 mg/l of $NO_3$-N in an hour from similar input solutions; however, at low N concentrations, removal rates were similar for both Al and Ca stearate. These results are described in Stoessell, Easley, and Yamazaki, (2001—copy attached to U.S. Provisional Patent Application Serial No. 60/205,158) for a number of different input solution concentrations of nitrate. Cellulose and other organic-aluminum compounds were also tested. These compounds were found to be utilized much less rapidly by bacteria as when using aluminum or calcium stearate. The general insoluble and hydrophobic nature of metal stearate compounds keeps it within a container and stable until bacteria destroy it as part of their metabolism. The use of Al stearate has an additional potential for phosphate removal. As aluminum is released it is precipitated, and some phosphate is removed from the effluent as an aluminum phosphate precipitate or by sorption onto precipitated aluminum hydroxides.

Use of the metal stearate denitrification system of the present invention in a denitrification cell is novel in its use as a flow-through cell for septic tank effluent that requires zero-maintenance over time spans of several or more years. The system withiri the cell eliminates any need to add phosphate because it a common constituent of the effluent. The cell can be a plastic container with a porous liner containing a loosely-packed mixture of metal stearate adhering to inert solids such as porous volcanic scoria with an overall porosity of about 50% (alternatively, though not preferably, another suitable inert solid such as pea gravel could be used). A small amount of soil is used as a bacteria source in the cell. The effluent is fed from an inlet port at the bottom to an outlet port at the top. The liner can be removed and the reactant mixture replaced once the stearate has been eaten by the bacteria. The metal stearate reactant mixture should last from 5 to 20 years, depending on the average daily effluent volume and input dissolved oxygen and nitrate concentrations, the container volume, and the amount of inert material used to keep the permeability and porosity high. A weight ratio of 0.34 of stearate, $OOC(CH_2)_{16}CH_3$ to dissolved oxygen, $O_2$, is required to remove the oxygen, and a weight ratio of 0.22 of stearate to nitrate, $NO_3$, is required for complete denitrification (Stoessell et al., 2001). These weight ratios can be used to compute the amount of metal stearate needed in the container for complete denitrification to occur for a particular time period.

The denitrification system example in a denitrification cell can be more completely described as a flow-through plastic container with a replaceable porous liner filled with a porous and permeable mixture of industrial-grade aluminum stearate and volcanic scoria with a small amount of soil as a bacteria source. Oxidized effluent from an aerated home-septic tank enters the container near its base and exits near its top. The insoluble and hydrophobic aluminum stearate remains in place as the fluid flows through the container. The aluminum stearate is gradually destroyed by bacteria that use the stearate as a metabolic food source. Some of the released aluminum is precipitated as aluminum phosphate. The entering effluent becomes anaerobic as bacteria removed the dissolved oxygen and then nitrate is removed by denitrifying bacteria. The container system is capable of denitrifying up to 26 mg/l of $NO_3$ in a reaction time of one hour using aluminum stearate.

This container system is advantageous in areas having either a high water table or limited lot space where a below-ground drain field is not practical for denitrification. At present, under these conditions, nitrogen-containing effluent is usually discharged to a ditch which can lead to nitrogen accumulation in surface waters, forming algae blooms and producing eutrophication in the water column. Possible Areas of Commercial Application of the Invention The system used within a denitrification cell can be an add-on to an aerated home-septic system lacking a drain field. Home septic systems without drain fields are in areas having a high water table, such as southern Louisiana, or with limited space, as on town lots in developing countries which lack municipal sewage systems.

The system also has application for use in aquarium systems to denitrify waters. A denitrification cell could be installed inline within the water circulation system of an aquarium to remove nitrate, using a metal stearate as a bacterial substrate.

The system can also be used as within a porous barrier to treat oxidized effluent from oxidation lagoons, landfills, industrial sources, and other aqueous nitrate sources. A mixture of the metal stearate and an inert porous material such as volcanic scoria would be installed as a porous denitrification barrier through which the effluent would be discharged.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
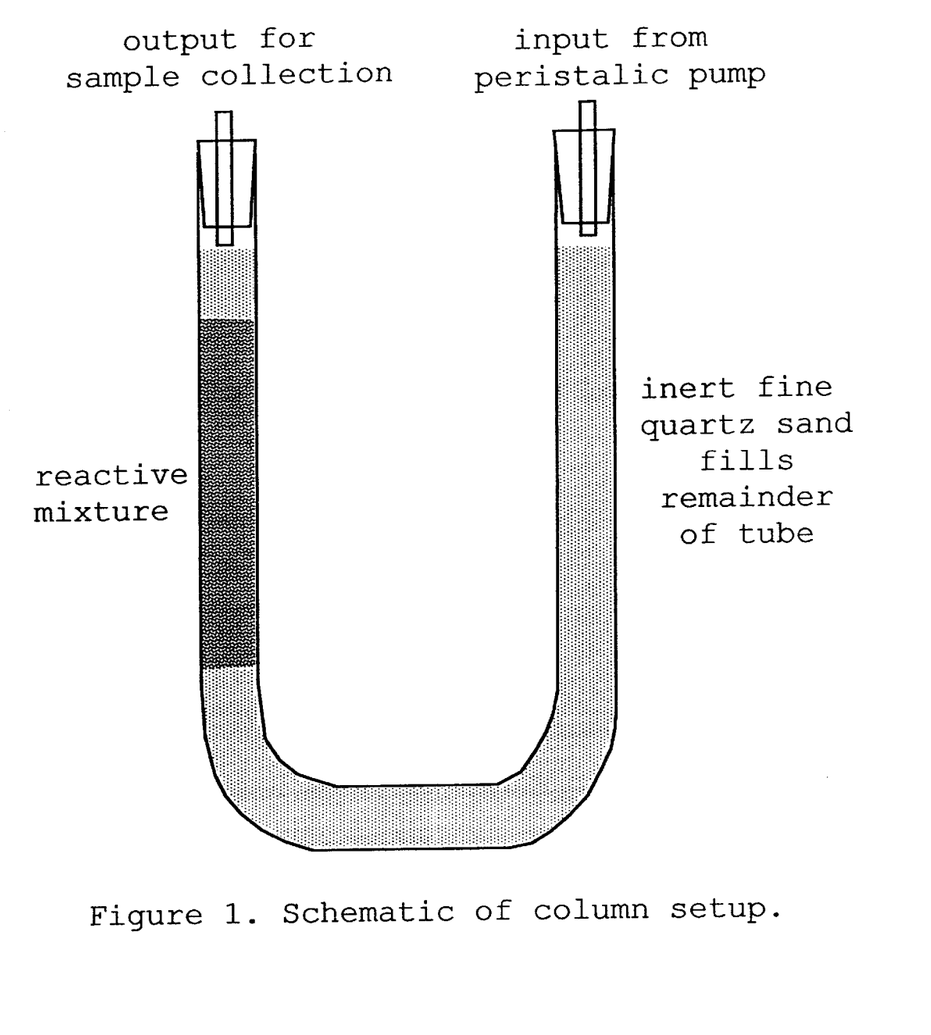
FIG. 1 is a perspective view of the preferred embodiment of the apparatus of the present invention.
Figure 2:
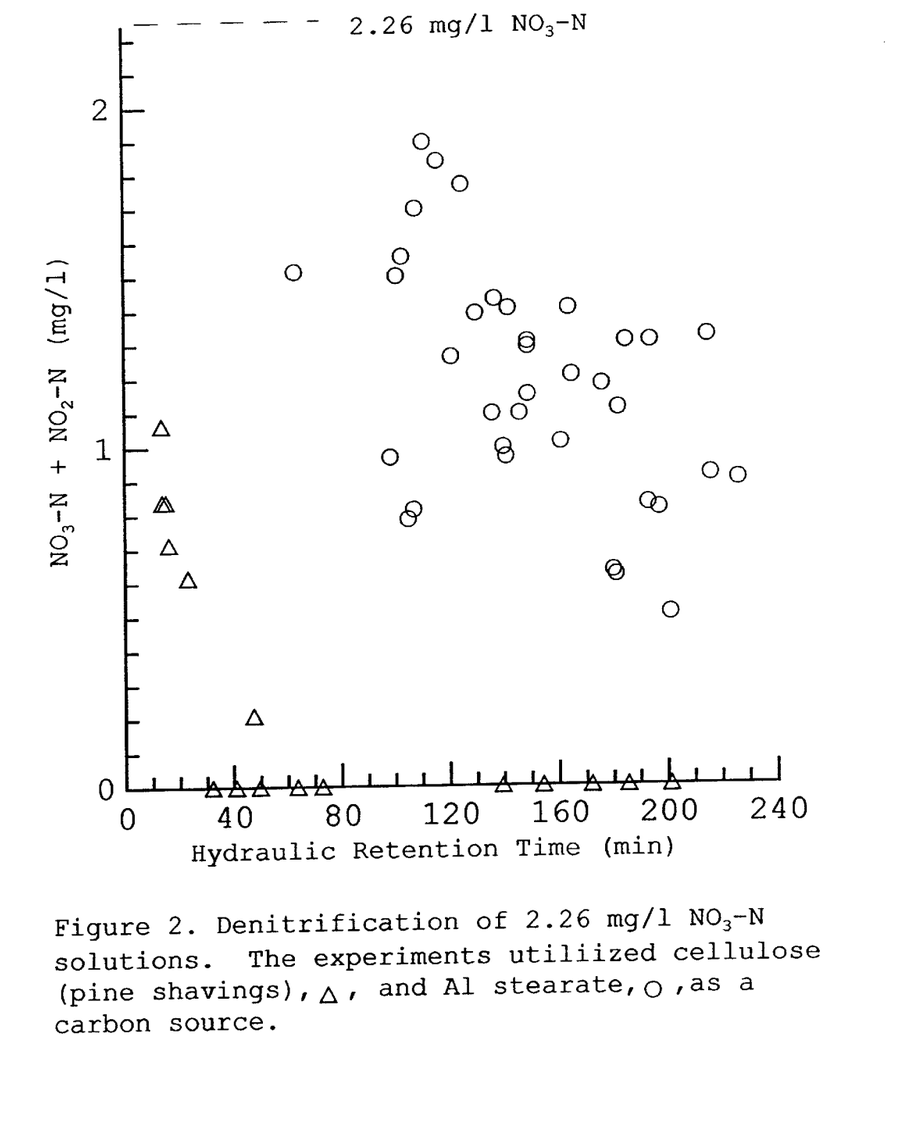
FIG. 2 is a comparison of the use of cellulose (pine shavings) and Al stearate in denitrification for input solutions that had 10 mg/l $NO_3$ (2.3 mg/l $NO_3$-N in 0161 mmolar $NaNO_3$)
Figure 3:
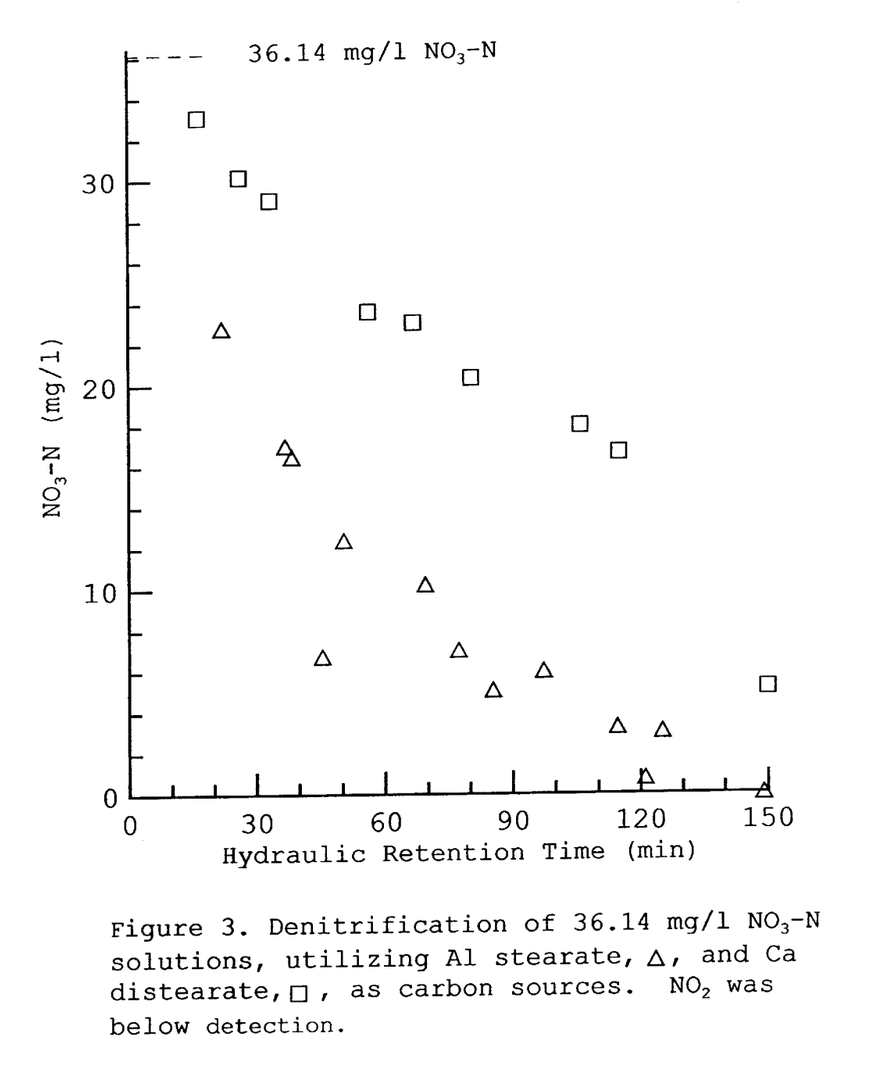
FIG. 3 compares the use of Al stearate and Ca stearate in denitrification for input solutions that had 160 mg/l $NO_3$ (36.1 mg/l $NO_3$-N in 2.580 mmolar $KNO_3$)
Figure 4:
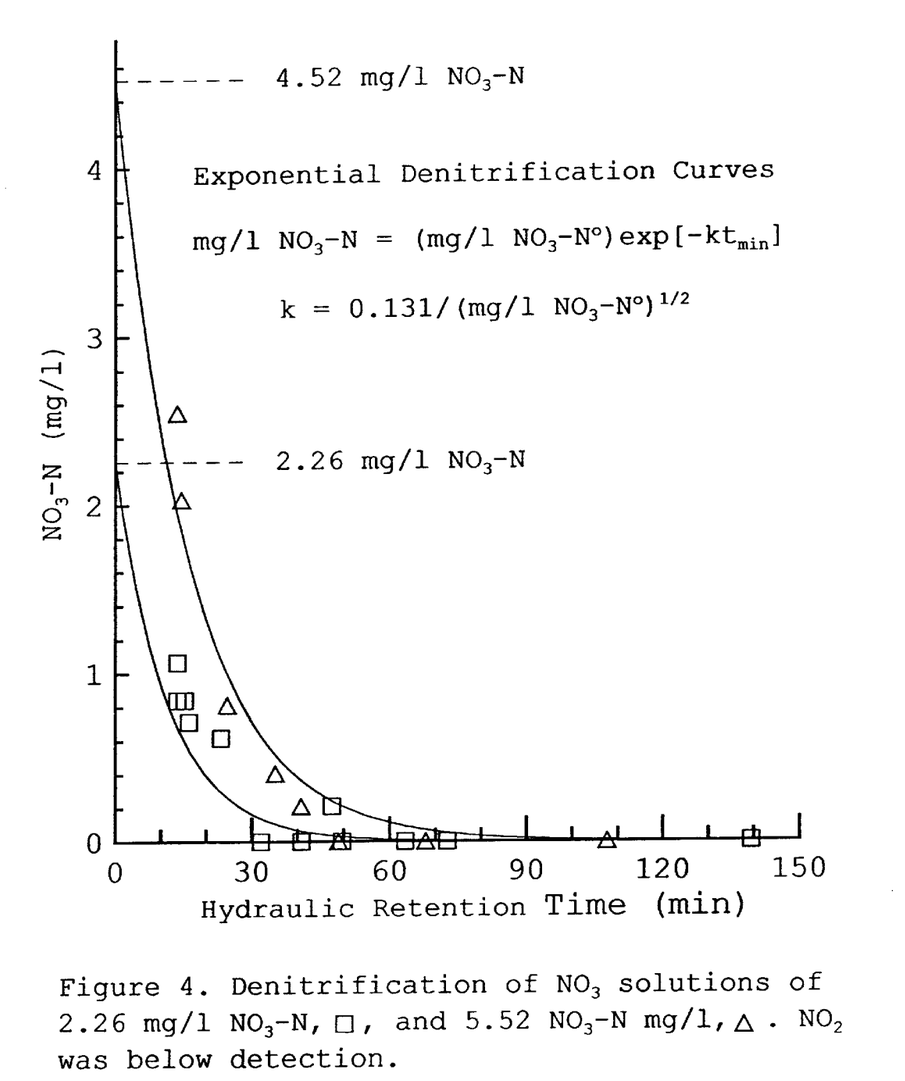
FIGS. 4 and 5 are plots of the data in Table 2 of the paper attached to U.S. Provisional Patent Application Serial No. 60/205,158 from the Al stearate experiments.
Figure 5:
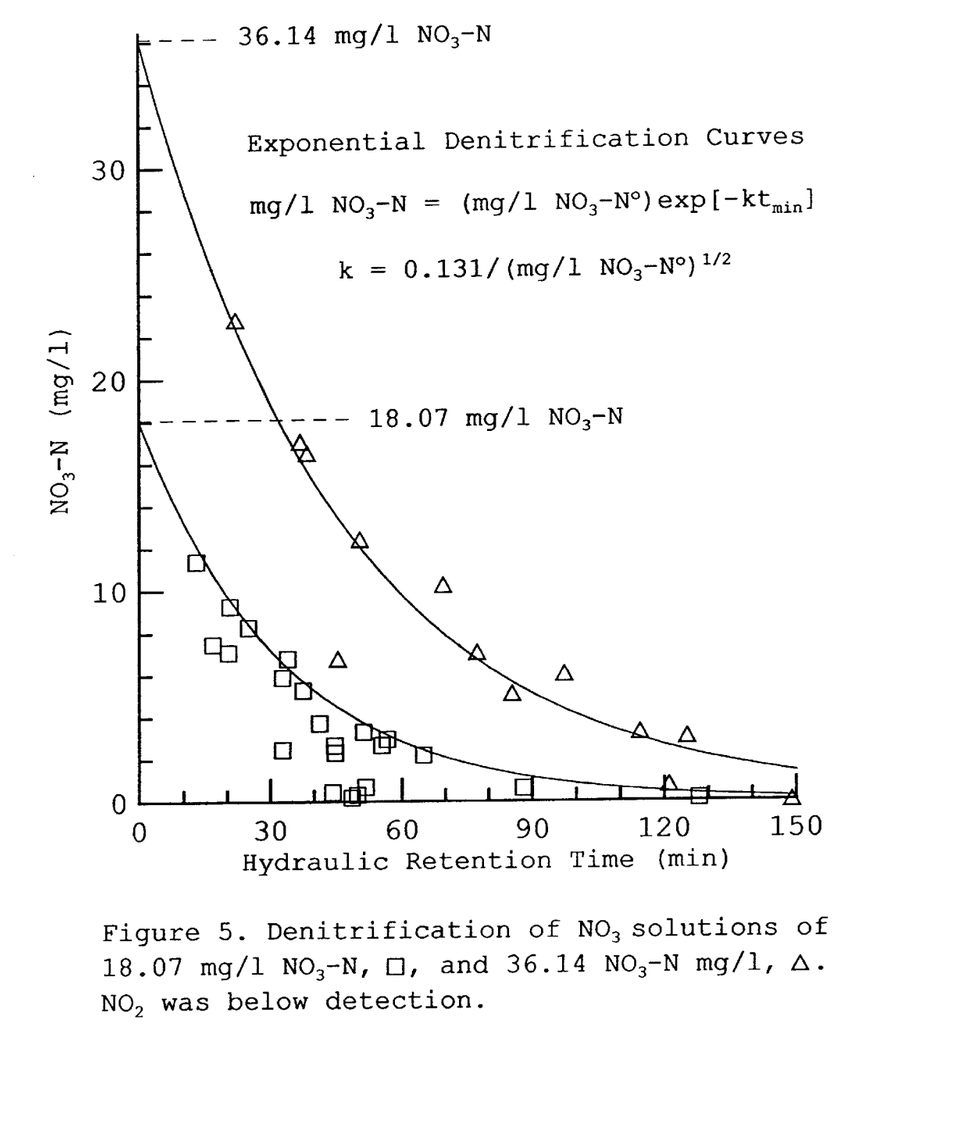
Figure 6:
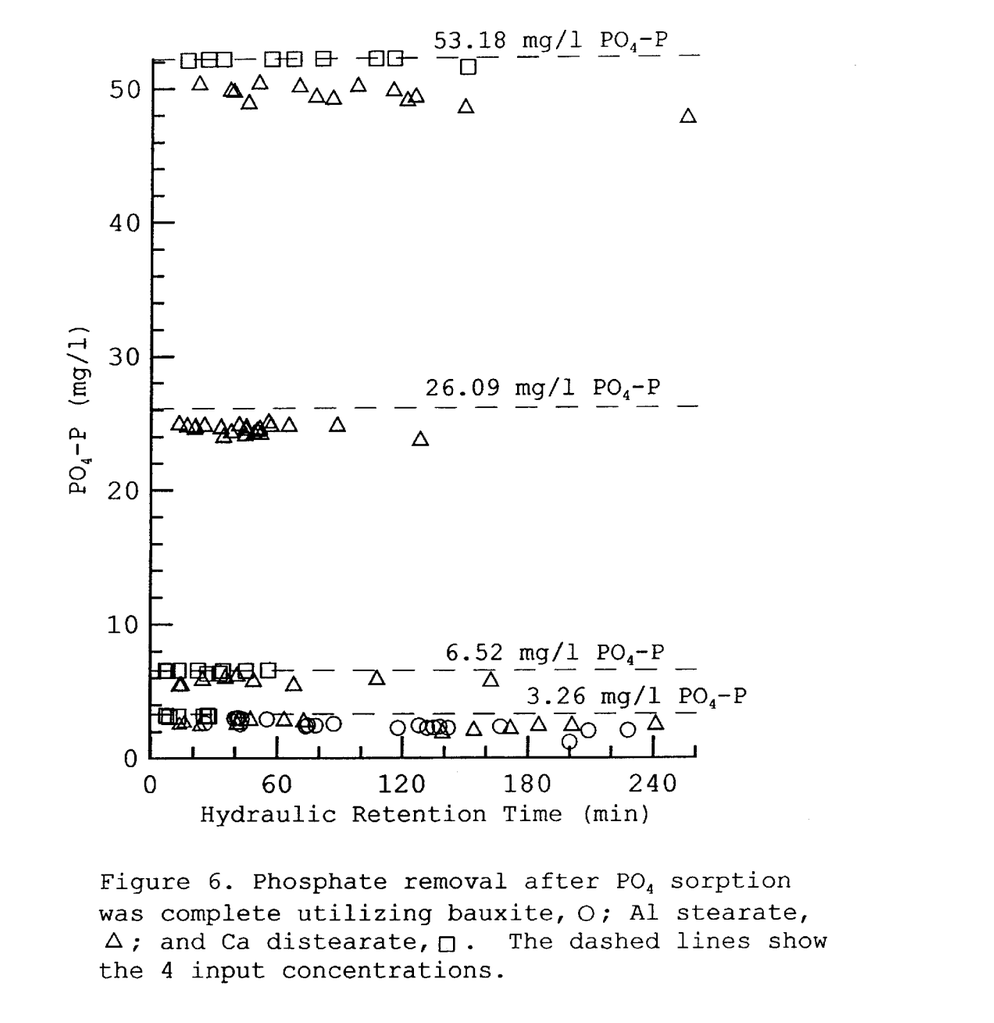
FIG. 6 shows the aqueous phosphate concentrations plotted as a function of reaction time.
Figure 7:
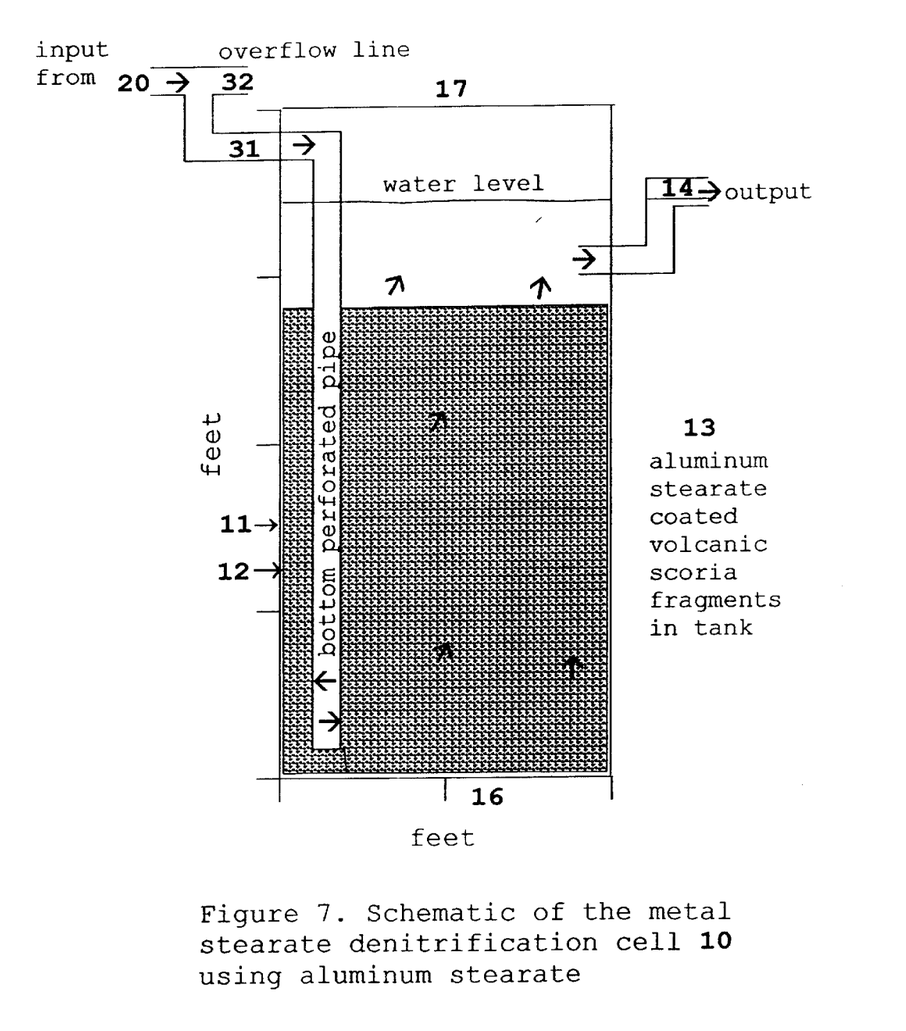
FIG. 7 is a schematic diagram showing the system of the present invention used in a denitrification cell.

The metal stearate denitrification system of the present invention used in a cell 10 can be an in-line system for denitrification of aerobic septic-tank effluent prior to being discharged into a drainage ditch or to a street curb.

Flow-through column experiments show aluminum stearate to be an extremely efficient substrate in denitrification, removing up to 26 mg/l of $NO_3$-N in an hour from input solutions containing 36 mg/l $NO_3$-N. Ca stearate was less efficient, removing 13 mg/l of $NO_3$-N in an hour from similar input solutions; however, at low N concentrations, removal rates were similar for both Al and Ca stearate. These results are described in Stoessell, Easley, and Yamazaki, (2001—copy attached to U.S. Provisional Patent Application Serial No. 60/205,158) for a number of different input solution concentrations of nitrate. Cellulose and other organic aluminum compounds were also tested. These compounds were found to be utilized much less rapidly by bacteria as when using aluminum or calcium stearate. The general insoluble and hydrophobic nature of metal stearate compounds keeps it within a container and stable until bacteria destroy it as part of their metabolism. The use of Al stearate has an additional potential for phosphate removal. As aluminum is released it is precipitated, and some phosphate is removed from the effluent as an aluminum phosphate precipitate or by sorption onto precipitated aluminum hydroxides.

Use of the metal stearate denitrification system of the present invention in a denitrification cell is novel in its use as a flow-through cell for septic tank effluent that requires zero-maintenance over time spans of several or more years. The system within the cell eliminates any need to add phosphate because it a common constituent of the effluent. The cell can be a plastic container with a porous liner containing a loosely-packed mixture of metal stearate adhering to inert solids such as porous volcanic scoria with an overall porosity of about 50%. A small amount of soil is used as a bacteria source in the cell. The effluent is fed from an inlet port at the bottom to an outlet port at the top. The liner can be removed and the reactant mixture replaced once the stearate has been eaten by the bacteria. The metal stearate reactant mixture should last from 5 to 20 years, depending on the average daily effluent volume and input dissolved oxygen and nitrate concentrations, the container volume, and the amount of inert material used to keep the permeability and porosity high. A weight ratio of 0.34 of stearate, $OOC(CH_2)_{16}CH_3$ to dissolved oxygen, $O_2$, is required to remove the oxygen, and a weight ratio of 0.22 of stearate to nitrate, $NO_3$, is required for complete denitrification (Stoessell et al., 2001). These weight ratios can be used to compute the amount of metal stearate needed in the container for complete denitrification to occur for a particular time period.

The denitrification system example in a denitrification cell 10 can be more completely described as a flow-through plastic container 11 with a replaceable porous liner 12 filled with a porous and permeable mixture 13 of industrial-grade aluminum stearate and volcanic scoria with a small amount of soil as a bacteria source. Oxidized effluent 14 from an aerated homeseptic tank enters the container 11 near its base 16 and exits near its top 17. The insoluble and hydrophobic aluminum stearate remains in place as the fluid flows through the container 11. The aluminum stearate is gradually destroyed by bacteria that use the stearate as a metabolic food source. Some of the released aluminum is precipitated as aluminum phosphate. The entering effluent becomes anaerobic as bacteria removed the dissolved oxygen and then nitrate is removed by denitrifying bacteria. The container system is capable of denitrifying up to 26 mg/l of $NO_3$-N in a reaction time of one hour using aluminum stearate.

This container system is advantageous in areas having either a high water table or limited lot space where a below-ground drain field is not practical for denitrification. At present, under these conditions, nitrogen-containing effluent is usually discharged to a ditch which can lead to nitrogen accumulation in surface waters, forming algae blooms and producing eutrophication in the water column.

Possible Areas of Commercial Application of the Invention

The system used within a denitrification cell can be an add-on to an aerated home-septic system lacking a drain field. Home septic systems without drain fields are in areas having a high water table, such as southern Louisiana, or with limited space, as on town lots in developing countries which lack municipal sewage systems.

The system also has application for use in aquarium systems to denitrify waters. A small denitrification cell could be installed inline within the water circulation system of an aquarium to remove nitrate, using a metal stearate as a bacterial substrate.

The system can also be used as within a porous barrier to treat oxidized effluent from oxidation lagoons, landfills, industrial sources, and other aqueous nitrate sources. A mixture of the metal stearate and an inert porous material such as volcanic scoria would be installed as a porous denitrification barrier through which the effluent would be discharged.

In most systems in which the present invention is used, aerobic bacteria first remove the dissolved oxygen in the fluid, and then anaerobic bacteria denitrify the nitrate.

PARTS LIST

The following is a list of parts and materials suitable for use in the present invention:

10 denitrification cell 10 of the preferred embodiment of the present invention

11 flow-through plastic container (made of plastic, for example)

12 liner (preferably replaceable and porous)

13 permeable mixture of metal stearate and volcanic scoria and a small amount of soil as a bacteria source 14 effluent line from container 11 (made of plastic, for example)
16 base of container 11
17 top of container 11
20 septic tank (made of plastic or concrete, for example)
31 effluent line from septic tank 20 (made of plastic, for example)
32 overflow line from septic tank 20 (made of plastic, for example)

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A long-term and low maintenance aqueous denitrification system comprising:
    a porous and permeable mixture of insoluble and hydrophobic metal stearate (reactant), and volcanic scoria or other inert granular material, and a minor amount of a bacteria source within a container;
    means for introducing nitrate-containing effluent having a nitrate concentration into the container;
    and means for allowing the aqueous solution to remain within the container for an effective time for denitrification to decrease the nitrate concentration to a desired level.

2. The system of claim 1 further comprising means for allowing the mixture of insoluble metal stearate, inert granular material, and minor amount of bacteria source in the liner to be replaced when the stearate has been removed by the metabolic activity of the bacteria.

3. The system of 1 wherein the mixture is contained in a porous liner.

4. The system of 1 wherein the container is plastic.

5. The system of claim 1 wherein the container has a minimum volume of 35 gallons.

6. The system of claim 1 wherein the means for introducing nitrate-containing effluent having a nitrate concentration into the container includes means for introducing effluent from a septic tank.

7. The system of claim 1 wherein the means for introducing nitrate-containing effluent having a nitrate concentration into the container includes means for introducing effluent which is substantially free of organic particulate matter.

8. The system of claim 1 wherein the effluent enters the container from a bottom inlet port and exits from a top outlet port.

9. The system of claim 1 wherein the means for allowing the aqueous solution to remain within the container for an effective time for denitrification to decrease the nitrate concentration to a desired level includes means for allowing the aqueous solution to remain within the container for about 1–2 hours.

10. The system of claim 2 wherein the bacteria source is about 100–200 grams of soil.

11. A long-term and low-maintenance aqueous denitrification system comprising:
    a porous and permeable mixture of insoluble and hydrophobic metal stearate (reactant), inert granular material, and a minor amount of a bacterial source within a container;
    means for introducing a nitrate-containing aqueous solution having a nitrate concentration into the container;
    and means for allowing the aqueous solution to remain within the container for an effective time for denitrification to decrease the nitrate concentration to a desired level.

12. The system of claim 11 further comprising means for allowing the mixture of insoluble metal stearate and inert granular material in the liner to be replaced when the stearate has been removed by the metabolic activity of the bacteria.

13. The system of claim 11 wherein the mixture is contained in a porous liner.

14. The system of claim 11 wherein the container is plastic.

15. The system of claim 11 wherein the container has a minimum volume of 35 gallons.

16. The system of claim 11 wherein the means for introducing a nitrate-containing aqueous solution having a nitrate concentration into the container comprises means for introducing effluent from a septic tank.

17. The system of claim 11 wherein the means for introducing a nitrate-containing aqueous solution having a nitrate concentration into the container comprises means for introducing into the container aqueous solution which is substantially free of organic particulate matter.

18. The system of claim 11 wherein the aqueous solution enters the container from a bottom inlet port and exits from a top outlet port.

19. The system of claim 11 wherein the means for allowing the aqueous solution to remain within the container for an effective time for denitrification to decrease the nitrate concentration to a desired level comprises means for allowing the aqueous solution to remain within the container for about 1–2 hours.

20. The system of claim 11 wherein the bacteria source is about 100 to 200 grams of soil.

* * * * *